Sept. 7, 1926.  1,598,944
J. TESSIER
MOTION PICTURE PROJECTOR
Filed Oct. 4, 1923   2 Sheets-Sheet 1
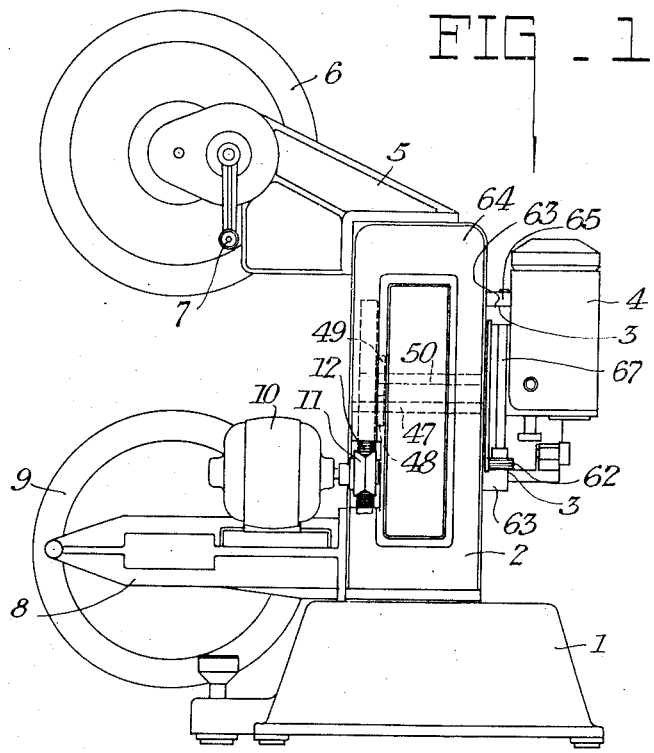
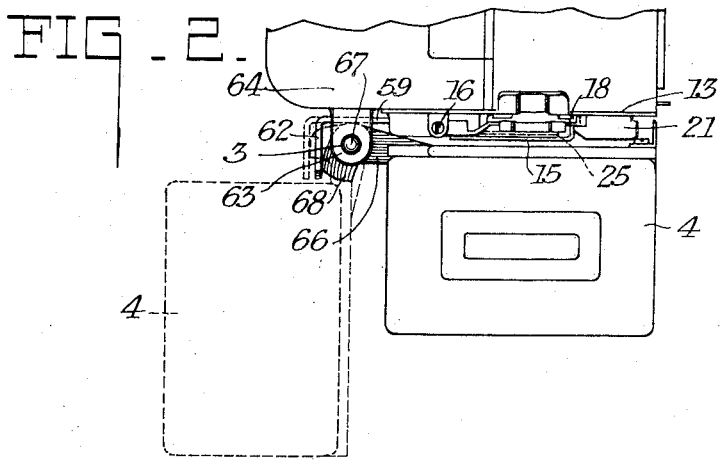
INVENTOR,
Julien Tessier,
BY
ATTORNEYS.

Sept. 7, 1926.
J. TESSIER
MOTION PICTURE PROJECTOR
Filed Oct. 4, 1923  2 Sheets-Sheet 2
1,598,944
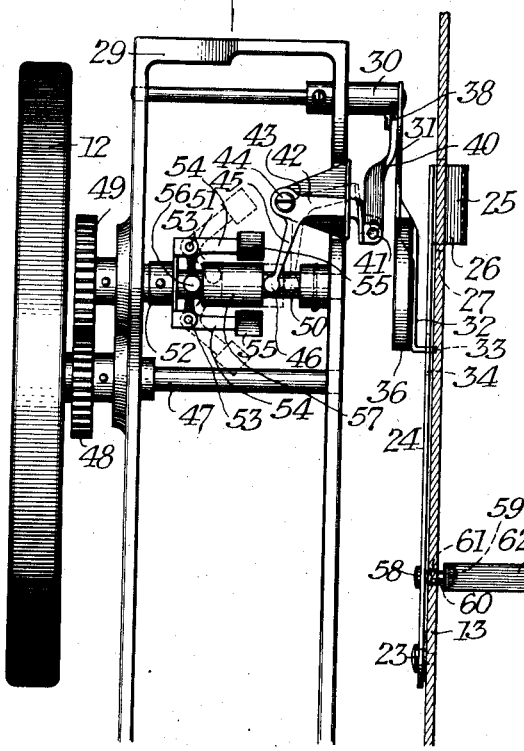
FIG_3_
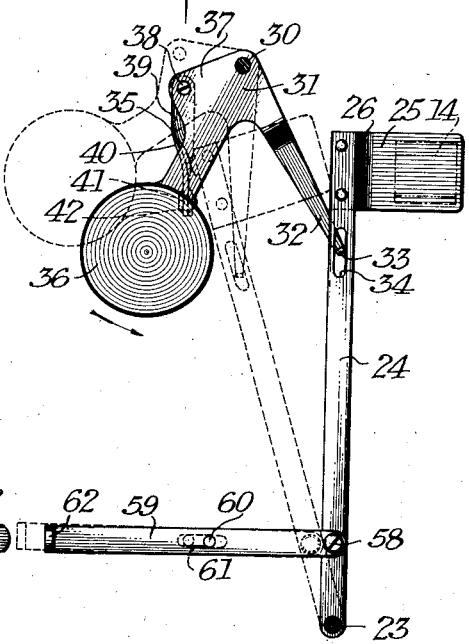
FIG_4_
FIG_5_
FIG_6_
INVENTOR,
Julien Tessier,
BY
ATTORNEYS.

Patented Sept. 7, 1926.

1,598,944

UNITED STATES PATENT OFFICE.

JULIEN TESSIER, OF ROCHESTER, NEW YORK, ASSIGNOR TO EASTMAN KODAK COMPANY, OF ROCHESTER, NEW YORK, A CORPORATION OF NEW YORK.

MOTION-PICTURE PROJECTOR.

Application filed October 4, 1923. Serial No. 666,622.

This invention relates to motion picture projecting apparatus and more particularly to the mechanism for controlling the position of the safety shutter.

The object of my invention is to provide a safety shutter in a projector having a hinged gate, so designed that it will be automatically moved out of position to interfere with the opening of the gate when the lamp house, which is also pivoted, is swung to inoperative position, but which will interfere with the opening of the gate when the lamp house is partially open. Other objects will appear in the following specification, in which reference is made to the accompanying drawings, in the several figures of which the same reference characters are used throughout to designate the same parts, and in which Fig. 1 is an outline side view of the projector as a whole showing the relative position of the principal elements;

Fig. 2 is a plan showing the lamp house and a portion of the main housing to which it is hinged;

Fig. 3 is a side view of the governor and safety shutter mechanisms;

Fig. 4 is a view from the right of Fig. 3, showing the safety shutter elements only;

Fig. 5 is a view of the projecting gate with the safety shutter shown in dotted lines in three positions;

Fig. 6 is a side view of the gate and shutter, parts being broken away.

In Fig. 1 is shown a projector having a base 1 supporting a main housing 2, to which is hinged at 3 a lamp house 4. To the top of the main casing is attached an arm 5 carrying a supply reel 6 and having the usual rewinding handle 7; and on a lower arm 8 is carried a take-up reel 9. A motor 10 is mounted to drive a pulley 11 bearing frictionally against a flywheel 12 and thus driving the mechanism. The further details of the projector as a whole are not of present importance.

The rear wall 13 of the main housing to which the lamp house is hinged has a window 14 through which light may be projected and a gate member 15 is pivoted at 16 to the wall 13. This member consists of spaced plates 17 and 18 rigidly connected by rivets 19 and having the window 20 therethrough in alignment, when closed, with the window 14, and adapted to be held in closed position by a finger latch 21 engaging the inner plate 18, which extends beyond the outer plate 17. Downturned edge lugs 22 on plate 17 hold the plates properly spaced.

Pivoted at 23 to wall 13 is an arm 24 carrying a shutter 25 which may either be of opaque material or of material that does not transmit heat rays, though transmitting some light. The arm 24 is within the main housing 2, but the shutter 25 is offset by an elbow 26 which passes through an aperture 27 in the wall 13. A fixed shield 28 covers the aperture 27 and contains the shutter 25 when in retracted position. The shutter may be swung from its position in the shield to a position in registration with the windows 14 and 20, as indicated in Fig. 5. The elbow 26 is of sufficient length to space the shutter 25 from the wall 13 and position it between the plates 17 and 18 of the gate, this being shown in Fig. 6.

Within the main housing 2 is a fixed frame 29 to which is pivoted at 30 an elbow lever 31, one arm 32 of which has in its end a pin 33 engaging in slot 34 of arm 24, and the other arm 35 of which carries at its end a weight 36. On an offset 37 of arm 35 and intermediate the weight 36 and pivot 30 is pivoted at 38 one end of a link 39, which is twisted at a right angle at 40 and at its other end 41 is pivoted to an arm 42 of elbow lever 43 which in turn is pivoted at its elbow 44 to the fixed frame 29 and the other arm 45 of which has a rounded bearing end 46.

The flywheel 12 is carried on a shaft 47 supported by the frame 29. On this shaft is a gear 48 intermeshing with and driving a second gear 49 on shaft 50 mounted in frame 29. This shaft carries a centrifugal governor 51 comprising a collar 52 fixed to the shaft 50 and having pivoted thereto at 53 the crank arms 54 each of which carries a weight 55 and a bearing arm 56, the latter bearing against one end of a cylinder 57 sliding on shaft 50. The other end of the cylinder is engaged by the member 46.

It is understood that the projector includes other mechanism, not shown and not necessary for an understanding of the invention, which is actuated from the flywheel and which draws the film through the projector, so that speed of the shaft 50 has a definite relation to the speed of the other moving parts and of the film.

As is obvious, when the mechanism, including shaft 50, is in motion the weights 55 tend to fly outwardly, as indicated in dotted lines in Fig. 3, moving the cylinder to the right and swinging elbow lever 43. This moves elbow lever 31 raising weight 36 to dotted line position (Fig. 4), and moves safety shutter 25 from its position in line with the windows 25 from its position in line with the windows to position under the shield 28, these positions being indicated on Figs. 4 and 5.

It is apparent that the safety shutter will interfere with the opening of the gate 15, which must be done when the machine is not in motion, in order to properly thread the film between plate 18 and wall 15. It is necessary not only to move the safety shutter from such interfering position, but also to swing the lamp house open to give access to the gate, and moreover to swing it to such a position that it cannot possibly cast light upon the gate. I, therefore, have provided for the opening of the lamp house to move the safety shutter automatically from its shielding position, but it does not cease to interfere with the movement of the gate when the latter becomes first accessible but only when the lamp house is swung to fully open position. This is accomplished in the following manner.

To the arm 24 is pivoted, by means of bolt 58, one end of a bar 59, the bolt 58 extending through an aperture (not shown) in wall 13. The bar 59 carries a pin 60 extending into a guide slot 61 in wall 13 and indicated in dotted lines in Fig. 4, so that the bar slides with a very slight oscillatory motion, as indicated in dotted lines in Fig. 4. The bar 59 extends beyond the pivotal connection 3 and at its end is an outwardly turned lug 62. The pivotal connection comprises apertured lugs 63 extending from wall 64 and lugs 65 and 66 extending from the lamp house 4, these being joined to lugs 63 by pivot pins 67. The lower lug 66 has a cam extension 68 protruding beyond the pin 67 and adapted to engage the lug 62. As the lamp house 4 is turned on its pivots this cam 68 moves the lug 62 and bar 59 and arm 24, thus also moving the safety shutter 25 and lifting weight 36. As the lamp house is swung to open position the safety shutter thus is moved out of position to interfere with the gate 15. However, when the lamp house is only partially swung and the gate 15 is accessible, the shutter will have reached an intermediate position, indicated in dotted lines at B in Fig. 5, at which it will still engage the gate and interfere with it. It is necessary, therefore, to move the lamp house further to such a position that it cannot possibly throw light upon the gate before the shutter will be automatically moved beyond interfering position. The weight 36 causes the shutter 25 to return to normal position when the lamp house is swung to closed position.

The lug 62 can be used as a manual means for moving the safety shutter should it be desirable, as for focusing before starting the mechanism.

It is obvious that numerous embodiments are possible, and I contemplate as within the scope of my invention all such modifications and equivalents as fall within the terms of the appended claims.

Having thus described my invention, what I claim as new and desire to secure by Letters Patent is:

1. In a motion picture projector, a movable gate, a shutter having a position in which it interferes with the movement of the gate and another position in which it does not so interfere, a movable lamp house, and means for automatically moving said shutter when the lamp house is moved.

2. In a motion picture projector, a fixed frame carrying a projection window, a gate movable with respect to said frame and having a window in registration with said first named window, a movable safety shutter carried by said frame and having a normal position in registration with the windows, a movable lamp house and means for automatically moving said safety shutter out of registration with said windows when the lamp house is moved.

3. In a motion picture projector, a movable gate with a projection window, a shutter having a position in which it interferes with the movement of the gate, a lamp house having a position at which it illuminates the gate and movable to a position at which it does not illuminate the gate, and means for automatically moving said shutter away from said interfering position as the lamp house is moved from the first position to the second.

4. In a motion picture projector, a movable gate with a projection window, a shutter having a position in registration with the window and adapted to interfere with the movement of the gate, a lamp house having a position at which it illuminates the gate and movable to a position at which it does not illuminate the gate, and means operative automatically as the lamp house is moved to move the shutter away from the window and from interfering position, the shutter being in a position so that it does not interfere only when the lamp house has fully reached a position at which it does not illuminate the gate.

5. In a motion picture projector, a movable gate having a window, film moving mechanism, a shutter having a position in registration with said window at which it interferes with the movement of the gate, a movable lamp house, means controlled by the partial movement of the lamp house to remove the shutter from registration with the window and by the complete movement of the lamp house to remove the shutter from interfering with the gate.

6. In a motion picture projector, a movable gate having a window, film moving mechanism, a shutter having a position in registration with said window at which it interferes with the movement of the gate, means controlled by the speed of the mechanism for moving said gate away from registration with the window, a movable lamp house and means controlled by the movement of the lamp house for moving the shutter to a position where it does not interfere with the movement of the gate.

7. In a motion picture projector, a movable gate having a projection window, a shutter having a position in which it interferes with the movement of the gate, a lamp house adapted to illuminate the window and hinged to swing to an inoperative position, a member connected to the shutter, and a cam connected to the lamp house and operative to engage said member and move said shutter as the lamp house is swung.

8. In a motion picture projector having a projection window and film moving mechanism, a safety shutter normally positioned in registration with the window, means controlled by the speed of the mechanism for removing the shutter from such position, a lamp house adapted to illuminate the window and movable to an inoperative position, and means controlled by the movement of the lamp house from operative to inoperative position for removing the shutter from its normal position.

9. In a motion picture projector having a projection window and film moving mechanism, a safety shutter normally positioned in registration with the window, means controlled by the speed of the mechanism for removing the shutter from such position, a lamp house adapted to illuminate the window and pivoted to swing to an inoperative position, a member connected to the shutter, and a cam connected to the lamp house and operative to engage said member and move said shutter as the lamp house is swung.

10. In a motion picture projector having film moving mechanism a hinged gate with a projection window, a safety shutter having a normal position in registration with said window at which it interferes with the swinging of the gate, means controlled by the speed of the mechanism for removing the shutter from said position, a lamp house adapted to illuminate said window and pivoted to swing to an inoperative position, a member connected to the shutter and a cam connected to the lamp house and operative to engage said member as the lamp house is swung and thereby move said shutter from its normal position.

Signed at Rochester, New York, this 2nd day of Oct. 1923.

JULIEN TESSIER.